(12) United States Patent
Li et al.

(10) Patent No.: US 8,655,901 B1
(45) Date of Patent: Feb. 18, 2014

(54) TRANSLATION-BASED QUERY PATTERN MINING

(75) Inventors: Xin Li, San Jose, CA (US); Shi Chen, Beijing (CN)

(73) Assignee: Google Inc., Mountain View, CA (US)

( * ) Notice: Subject to any disclaimer, the term of this patent is extended or adjusted under 35 U.S.C. 154(b) by 72 days.

(21) Appl. No.: 12/821,978

(22) Filed: Jun. 23, 2010

(51) Int. Cl.
 *G06F 7/00* (2006.01)

(52) U.S. Cl.
 USPC ............... 707/760; 707/713; 707/758; 704/7; 704/8

(58) Field of Classification Search
 USPC ............................ 707/713, 758, 760; 704/7, 8
 See application file for complete search history.

(56) References Cited

U.S. PATENT DOCUMENTS

| | | | |
|---|---|---|---|
| 4,688,195 A | 8/1987 | Thompson et al. | |
| 5,963,940 A * | 10/1999 | Liddy et al. | 707/999.005 |
| 6,006,221 A * | 12/1999 | Liddy et al. | 707/999.005 |
| 6,418,402 B1 * | 7/2002 | King et al. | 704/8 |
| 6,460,029 B1 | 10/2002 | Fries et al. | |
| 6,604,101 B1 * | 8/2003 | Chan et al. | 707/706 |
| 6,665,640 B1 * | 12/2003 | Bennett et al. | 704/257 |
| 6,741,959 B1 | 5/2004 | Kaiser | |
| 6,766,320 B1 | 7/2004 | Wang et al. | |
| 7,634,766 B2 * | 12/2009 | Ali et al. | 717/141 |
| 8,407,236 B2 * | 3/2013 | Chen et al. | 707/759 |
| 2004/0148278 A1 * | 7/2004 | Milo et al. | 707/3 |
| 2004/0172237 A1 | 9/2004 | Saldanha et al. | |
| 2004/0243568 A1 | 12/2004 | Wang et al. | |
| 2005/0197828 A1 * | 9/2005 | McConnell et al. | 704/9 |
| 2006/0265699 A1 * | 11/2006 | Ali et al. | 717/141 |
| 2008/0235199 A1 | 9/2008 | Li et al. | |

* cited by examiner

Primary Examiner — Cheyne D Ly (57) ABSTRACT

This specification describes technologies relating to search systems. In general, one aspect of the subject matter described in this specification can be embodied in methods that include the actions of receiving a query pattern, the query pattern identifying a particular rule to interpret a particular type of query, the query pattern being in a first language; identifying a collection of queries in the first language matching the query pattern; annotating each query of the collection of queries with one or more labels; translating the collection of annotated queries in the first language into a translated collection of queries in a second language; aligning the translated collection of queries including identifying a most common term in the translated collection of queries and determining the corresponding positions of the annotations relative to the translated query terms; and extracting a translated query pattern from the aligned translated collection of queries.

15 Claims, 4 Drawing Sheets

TRANSLATION-BASED QUERY PATTERN MINING

BACKGROUND

This instant specification relates to search systems.

Internet search engines aim to identify resources (e.g., web pages, images, text documents, multimedia context) that are relevant to a user's needs and to present information about the resources in a manner that is most useful to the user. Internet search engines return a set of search results in response to a user submitted query.

Some queries (e.g., queries with a geographic component) are split into components in order to be correctly interpreted. Conventionally, manually generated query patterns are used to match queries and to split the matched queries for interpretation.

SUMMARY

This specification describes technologies relating to search systems.

In general, one aspect of the subject matter described in this specification can be embodied in methods that include the actions of receiving a query pattern, the query pattern identifying a particular rule to interpret a particular type of query, the query pattern being in a first language; identifying a collection of queries in the first language matching the query pattern; annotating each query of the collection of queries with one or more labels; translating the collection of annotated queries in the first language into a translated collection of queries in a second language; aligning the translated collection of queries including identifying a most common term in the translated collection of queries and determining the corresponding positions of the annotations relative to the translated query terms; and extracting a translated query pattern from the aligned translated collection of queries. Other embodiments of this aspect include corresponding systems, apparatus, and computer program products.

These and other embodiments can optionally include one or more of the following features. Identifying a collection of queries in the first language matching the query pattern includes applying a pattern splitter to match the pattern to particular queries. Candidate queries are tokenized into a query vector for matching to the query pattern. The method further includes using the translated query pattern to interpret received queries in the second language matching the translated query pattern.

Using the translated query pattern includes applying the translated query pattern to a received query in order to identify one or more query splits into query components and using the resulting query components to search a respective index for each query component. The method further includes using the translated query pattern to search for results responsive to a received query in the second language and presenting search results.

Identifying a collection of queries includes identifying queries from a query log that match the query pattern. Annotating each query includes labeling portions of the query according to the query pattern. Extracting a translated query pattern further comprises cross validating the translated query pattern with a query log with respect to a specified occurrence threshold.

Particular embodiments of the subject matter described in this specification can be implemented to realize one or more of the following advantages. Automatically generating query patterns in multiple languages for a given query pattern in one language is performed more quickly than manual generation of query patterns. Translated query patterns are generated such that the query patterns have a high degree of confidence in translated languages. Manual query patterns typically require analysis of a large number of queries and corresponding user behavior, which can take additional time for newly launched languages. However, automatically generating translated query patterns can quickly increase search quality for newly launched languages by generating the translated query patterns without extensive query log analysis. Thus, the automatic query patterns can be generated in a shorter time for newly launched languages than typically required for manual query patterns.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference symbols in the various drawings indicate like elements.

DETAILED DESCRIPTION

Figure 1:
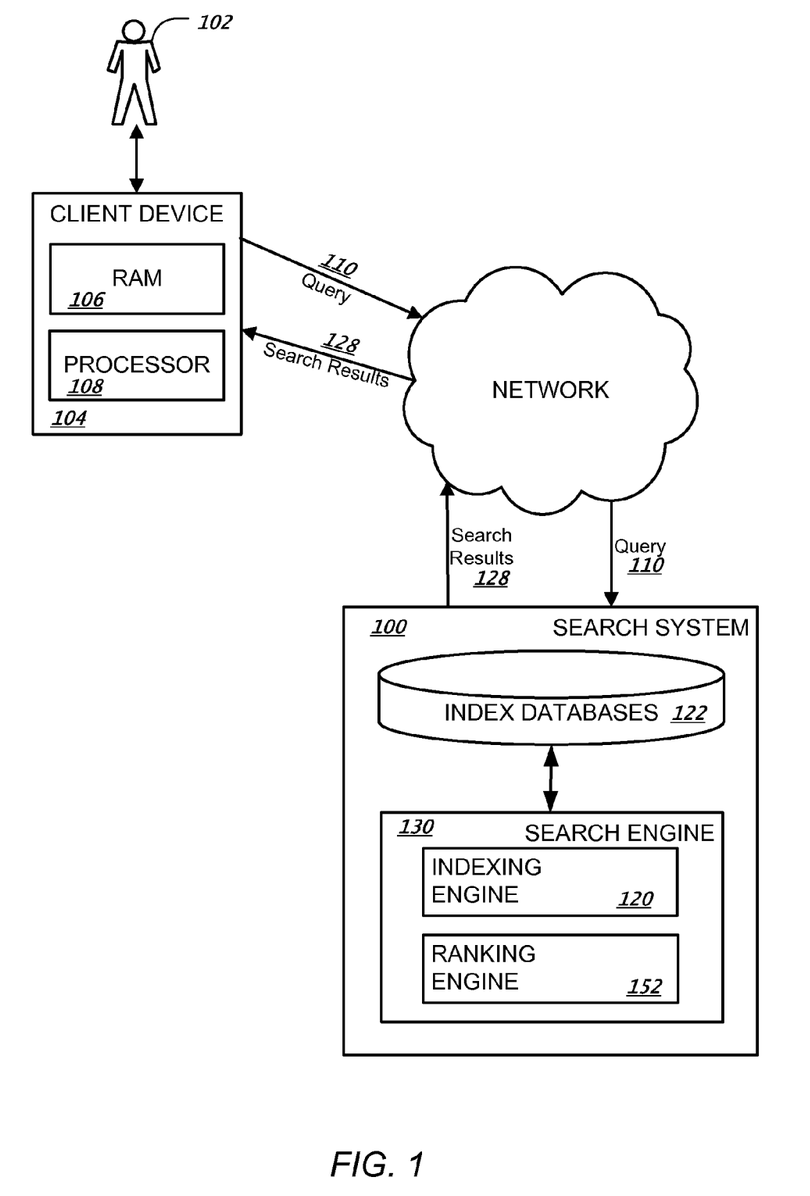
FIG. 1 is a block diagram of an example search system.

FIG. 1 shows an example search system 100 for providing search results relevant to submitted queries as can be implemented in an internet, an intranet, or another client and server environment. The search system 100 is an example of an information retrieval system in which the systems, components, and techniques described below can be implemented.

A user 102 can interact with the search system 100 through a client device 104. For example, the client 104 can be a computer coupled to the search system 100 through a local area network (LAN) or wide area network (WAN), e.g., the Internet. In some implementations, the search system 100 and the client device 104 can be one machine. For example, a user can install a desktop search application on the client device 104. The client device 104 will generally include a random access memory (RAM) 106 and a processor 108.

A user 102 can submit a query 110 to a search engine 130 within a search system 100. When the user 102 submits a query 110, the query 110 is transmitted through a network to the search system 100. The search system 100 can be implemented as, for example, computer programs running on one or more computers in one or more locations that are coupled to each other through a network. The search system 100 includes one or more index databases 122 and a search engine 130. The search system 100 responds to the query 110 by generating search results 128, which are transmitted through the network to the client device 104 in a form that can be presented to the user 102 (e.g., as a search results web page to be displayed in a web browser running on the client device 104).

When the query 110 is received by the search engine 130, the search engine 130 identifies resources that match the query 110. The search engine 130 will generally include an indexing engine 120 that indexes resources (e.g., web pages, images, or news articles on the Internet) found in one or more corpora (e.g., collections or repositories of content) in the one or more index databases 122 that store the index information and a ranking engine 152 (or other software) to rank the resources that match the query 110. The indexing and ranking of the resources can be performed using conventional techniques.

In some implementations, the one or more index databases 122 store different types of resources that can be searched separately using part or all of the query 110. For example, an index database of the index databases 122 can store index information associated with geographic resources, local resources, or other types of specifically indexed resources. The search engine 130 can submit the query or a query component to particular indices depending the interpretation of the query, e.g., using a query pattern as described below. The search engine 130 can transmit the search results 128 through the network to the client device 104 for presentation to the user 102.

Figure 2:
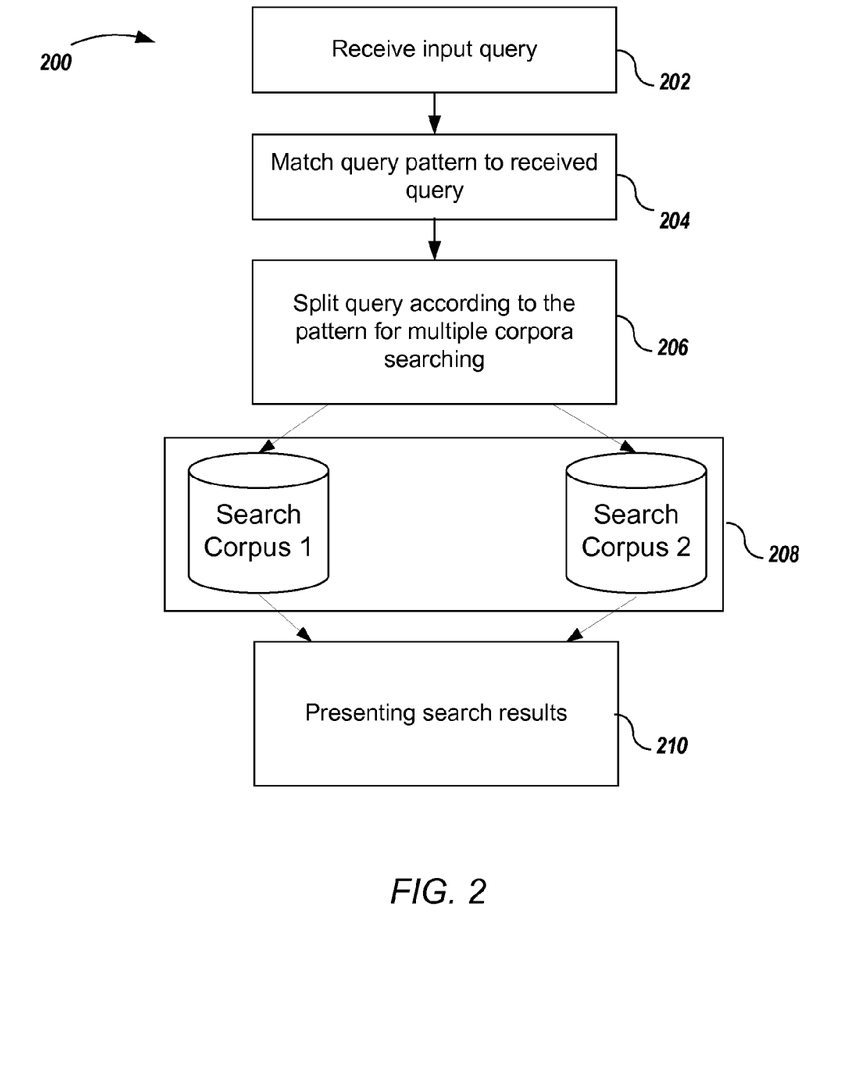
FIG. 2 is a flow diagram of an example search process.

FIG. 2 is a flow diagram of an example search process 200. For convenience, the search process 200 will be described with respect to a system (e.g., a system including one or more computing devices) that performs the search process 200.

The system receives 202 an input query. For example, the query can be received from a user through a user interface associated with a search system (e.g., the search system 100). In some implementations, the query is received in a user interface associated with a particular set of resources. In particular, the query can be received in a user interface of a mapping application that identifies geographic locations and other information associated with geographic locations based on user input.

For example, an input query "San Francisco" to a search interface can result in a map of San Francisco being displayed. Similarly, a query of "city hall San Francisco" can result in information associated with San Francisco's city hall being displayed relative to a map of San Francisco or to a relevant portion of San Francisco. The information can include, for example, the address of city hall, phone number for city hall, a position locator of city hall on the displayed map, images, reviews, links to web pages, and other responsive information. In another example, multiple results can be displayed relative to a displayed map, e.g., the query "restaurants near opera san francisco" can provide multiple mapped results for particular restaurants within a specified proximity of the opera house in San Francisco.

The system matches 204 a query pattern to the received query. A query pattern provides one or more predefined rules for matching a received query and interpreting the matched query. In some implementations, a number of query patterns are defined manually. In some implementations, query patterns are manually generated by testing various ways of splitting different types of queries and scoring candidate query patterns based on the results. A particular score, or confidence, can be required to select a query pattern from the candidate query patterns.

A query pattern can include, for example, a language identifier (e.g., French), a country or domain (e.g., France), stopwords, a connector, a confidence value, and a query splits filter strategy. Stopwords, e.g., "a" and "the" are words that do not provide information that assists in identifying search results (e.g., does not influence the results). The stopwords can be removed according to the pattern so that the stopwords are ignored in the input query when matching the query to a query pattern. In a mapping search system, additional stopwords can be used, for example, "map of" and "location of," which have no influence on the search results since all results are maps or locations. Therefore, these terms can also be discarded from received queries.

The query pattern can be associated with a particular confidence value. The confidence indicates a likelihood that a given query that matches a query pattern is correctly associated with that pattern. For example, different terms used in patterns can have multiple meanings, some of which may not apply to the pattern. As a result, the confidence for that particular pattern can be lower.

For example, a query pattern of the form {what} near {where} (e.g., "pizza near New York") can have a higher confidence than a query pattern in the form {what} in {where} (e.g., "pizza in New York") because there are fewer false positive matches with the query pattern {what} near {where}.

In particular, as used in the present specification, "{what}" is a placeholder for one or more query terms identifying a thing while "{where}" is a placeholder for one or more query terms identifying a location.

Specified information from a query pattern can be represented in a protocol buffer ("protobuffer") form. A protocol buffer is a language-neutral, platform-neutral, extensible way of serializing structured data. For example the query pattern form {what} near {where} can be described in protobuffer form as follows:

type: CONNECTOR
    language: "en"
    split_type: SPLIT_EXPLICIT
    connector: "near"
    location_first: false The example query pattern is for a connector between terms in a query. As shown in the protobuffer form, the language is English and the term of the connector is "near". The split_type indicates the action for splitting the query with respect to the connector term. Query splitting is described in greater detail below. The "location_first: false" indicates that when the connector term "near" occurs at the beginning of a query, this pattern does not apply. As a result, this query pattern describes a query joined by the term "near" where "near" cannot be the first term in the query. Thus, for example, the query pattern satisfies queries of the form {what} near {where}. As a result, the pattern is matched to queries that satisfy that format, e.g., "pizza near times square" and "burgers near 4th & king streets." When the pattern is matched, the pattern can be split at the connector into corresponding {what} and {where} query components.

Other types of query patterns can be generated. A prefix type query pattern has the form stopwords+{QUERY}. In this example, {QUERY} represents any valid query without the initial stopwords. When the prefix type query pattern is identified for a received input, the stopwords are removed. The remaining {QUERY} can be further matched to one or more other query patterns and split again, as described in greater detail below. Examples of queries in this form include "map of {QUERY}," "location of {QUERY}," and "where is {QUERY}."

A suffix type query pattern has the form: {QUERY}+stopwords. Similar to the prefix type query pattern, when the suffix type query pattern is identified for a received input, the stopwords are removed. The remaining {QUERY} can be further matched to one or more other query patterns and split again. Examples of queries in this form include "{QUERY} street map," and "{QUERY} map."

A prefix suffix type query pattern has the form: stopwords+{QUERY}+stopwords. Again, stopwords are removed, leaving the remaining query portion for additional processing. An example query in this form is "map of texas cities."

Combinations of query patterns can also be generated. For example, a prefix connector type query pattern has the form:

{BUSINESS}+connector+{LOCATION} OR stopwords+ {LOCATION}+connector+{BUSINESS}. For a query matching this type of query pattern, the stopwords are removed and the query split according to the connector, e.g., into a {BUSINESS} component (the "{what}" query component) and a {LOCATION} component (the "{where}" query component). An example query in this form is "map of {BUSINESS} near {LOCATION}."

In particular, the system tokenizes the received query. Each token can correspond to a query term or phrase in the query. The query can then be represented by a vector of tokens. This vector can then be matched against the query patterns. Tokenizing each query allows all queries, even those in different languages, to be matched to one or more query patterns. For example, the query "pizza near new york" is tokenized into the vector <pizza><near><new york> which matches the query pattern form {what} {connector} {where} for the connector "near".

The system splits 206 the query into query components according to the matching query pattern for multiple corpora searching. In some implementations, a query can be split more than once depending on the matched query patterns. For example, the connector pattern described above identifies a split at the connector. For a query of the form {what} near {where}, the pattern is split into query components corresponding to {what} and {where}. Each of these portions can be separately searched, for example, according to specialized indexes (e.g., a geocoding index). Thus, for the query "pizza near times square" is split into "pizza" and "times square". In another example, the query "map of restaurants near times square" can be first split according to the prefix type query pattern to remove the "map of" stopwords. The remaining query portion "restaurants near times square" matches a connector type query pattern and can be split into query components "restaurants" and "times square" for searching.

Different ways of splitting the query can be defined by the matching query pattern. For example, the "split_exact" query split type described above in the example query pattern only allows splits generated by the pattern. Any other query splits will be bypassed. Other query split types include "all," "local," and "geocode". The "all" type of query split allows any types of splits in the query.

The "local" type of query split only allows a nonempty {what} split. The {where} can be empty. This means that the query can be split in any manner as long as the split includes a nonempty {what} component (e.g., local splits). For example, the query "phone number of {QUERY}" can be split so that there is only a {where} portion, i.e., the {QUERY}. For example, the query "phone number of city hall" does not include a {where} portion (e.g., the location can be implicit in the current map or user location information). In another example, the query "phone number of city hall in san Francisco" can be reduced by the patterns to "city hall in san Francisco" where the results of the query search must include a phone number. Additionally, a "local" split indicates a search of a local index where results (e.g., businesses) are associated with information such as a phone number of the business. If the {where} query component is nonempty, the local results can be restricted by the location identified in the {where} query component.

The "geocode" type of query split only allows an empty {what} split. For example, the query can simply identify a location, e.g., by name or address. Thus, for the query, "401 Van Ness Avenue, San Francisco" there is only a {where} query component split with an empty {what} query component. A geocode index can be searched for the precise location corresponding to the input query component (e.g., so that the location can be displayed on a map). This index can also identify what is located at or nearby that address, e.g., San Francisco City Hall, without a specific {what} query component.

The system searches 208 the corresponding indices for the respective query components of the split query. In some implementations, the query can be split more than once based on the applicable query patterns. Each portion of the query can be used to search an index for a particular corpus. For example, a query split into a {what} and a {where} according to a query pattern can be searched according to indices for two different corpora, e.g., a geocoding index for the {what} and a local search index for the {where} of the query.

The system presents 210 one or more search results responsive to the input query. In particular, the system combines results from the split query components submitted as separate searches in a specified order to identify search results responsive to the query. The result can include ranked, e.g., based on how well results match the query and only a specified number of top ranked results presented.

In some implementations, the search order first searches the {where} component followed by the {what} component as restricted by the {where} component. For example, given the query "pizza near times square" the system searched for both results responsive to "pizza" and the location of "times square". The query portion "times square" is searched first to identify the geolocation (e.g., in a geocode index) to retrieve geographic information associated with "times square." The query portion "pizza" is then searched with the geo-restriction near "times square".

Search results responsive to pizza, e.g., pizza restaurants, having addresses corresponding to a specified distance from "times square" can be presented as search results. Presentation of the search results can include displaying the location of each respective pizza restaurant on a map of Manhattan where the displayed pizza restaurants are located near times square.

Figure 3:
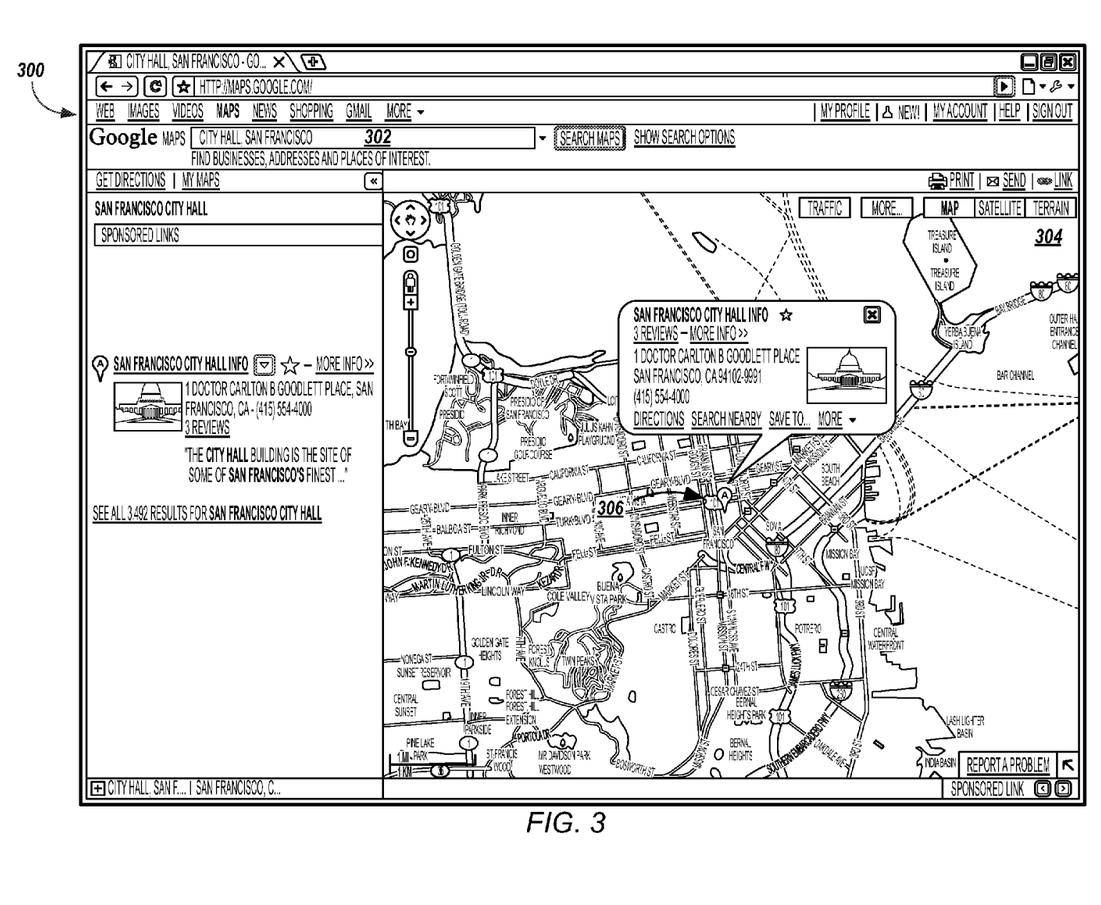
FIG. 3 is an screenshot of an example map search result for a query.

FIG. 3 is an screenshot 300 of an example map search result for a query. In particular, screenshot 300 shows the search result for the map query "city hall san francisco". In particular, the search query (e.g., entered into search field 302) results in a map 304 showing the location in San Francisco corresponding to city hall (e.g., as marker A 306). Additionally, information responsive to the query is displayed including associated with city hall and links to resources responsive to the query.

A query pattern in a given language may no longer provide accurate results when the query is received in another language. In addition to the terms being in different languages, the structure of one language may not match the given query pattern translated into another language.

Figure 4:
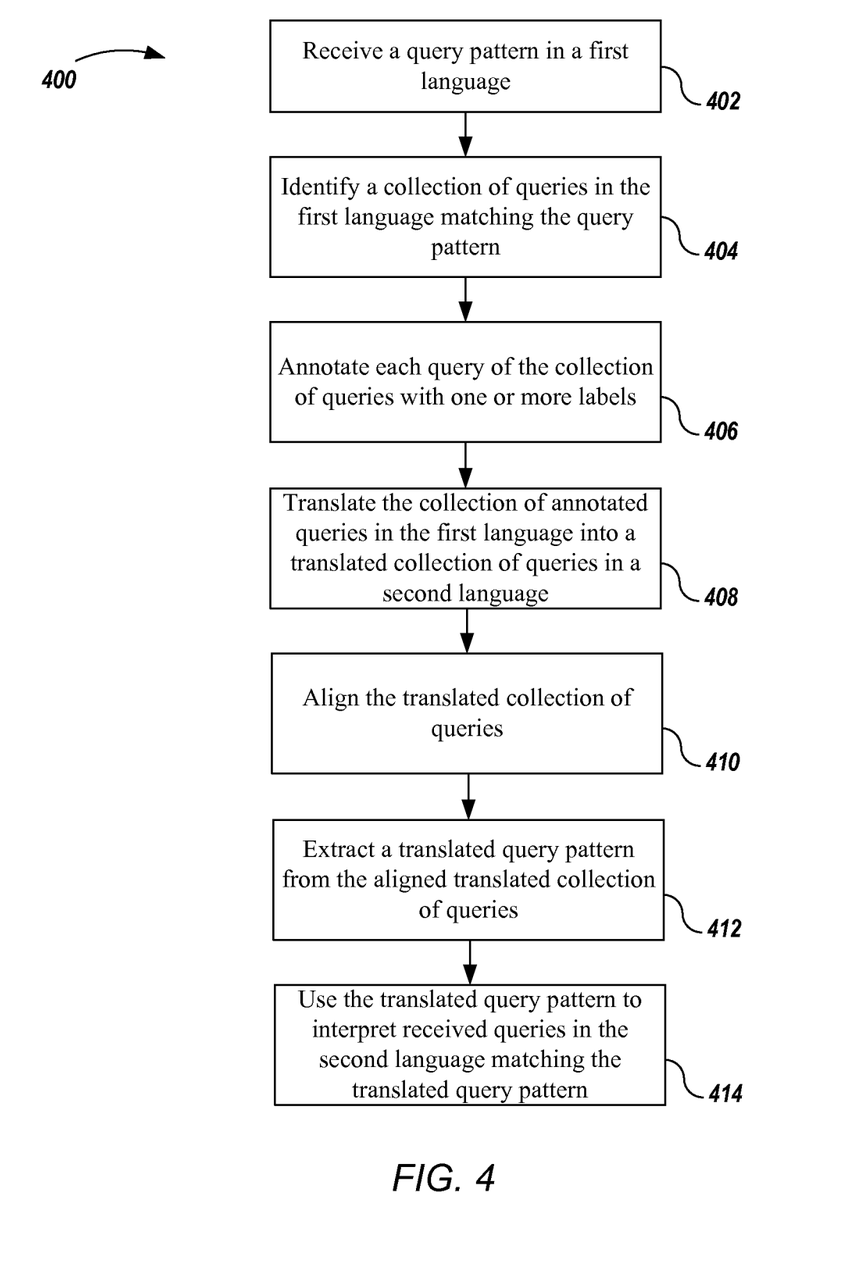
FIG. 4 is a flow diagram of an example process for identifying translated query patterns.

FIG. 4 is a flow diagram of an example process 400 for identifying translated query patterns. For convenience, the search process 400 will be described with respect to a system (e.g., a system including one or more computing devices) that performs the process 400.

The system receives 402 a query pattern in a first language. For example, an English query pattern can be selected or received from a collection of English language query patterns. The English language query pattern can be the "near" connector pattern that satisfies queries having the form {what} near {where}.

In particular, the process 400 will be described with respect to examples using the following query pattern {what} near {where} written, for example, in protocol buffer "protobuffer" format as:
    type: CONNECTOR
    language: "en"
    split_type: SPLIT_EXPLICIT
    connector: "near"
    location_first: false The system identifies 404 a collection of queries in the first language matching the query pattern. In particular, a query log of queries can be used to identify queries matching the query pattern. Matching the queries to the query pattern can be performed using the vectors of tokens as described above. For example, the query pattern can be applied to each of a specific number of tokenized queries from the query log to identify matches to the query pattern. In some implementations, the collection of queries are top queries in the query log matching the query pattern, for example, top 1000 matching queries based on frequency of the queries in the query log.

One or more additional criteria can be used in selecting the matching queries from the query log. For example, a length restriction on the queries can be applied. The length restriction can require a minimum threshold query length, e.g., four terms. The length restriction can be used to ensure sufficient query context to correctly translate the query. Empirical data can be used to identify a minimum query length that results in a maximum translation error rate.

Example queries matching the above shown query pattern are:
1) "pizza near times square"
2) "restaurants near forbes ave"

The system annotates 406 each query in the collection of queries. The queries are annotated with particular labels that identify parts of the query. The labels are specified in accordance with the query pattern components, e.g., {prefix} {suffix} {query} and {connector}. Thus, the annotations are taken from the query pattern and matched to the corresponding query terms. For example, the query "pizza near times square" can be annotated with the labels {what} {connector} {where} from the matching query pattern. In another example, the query "where is Pizza City" can be annotated with the labels {prefix} {query}.

The example queries provided above can be annotated as:
1) pizza {what} near {connector} times square {where}
2) restaurants {what} near {connector} forbes ave {where},
where {what} {connector} and {where} are respective annotations to portions of the queries based on the query pattern.

The system translates 408 the collection of queries in the first language into a translated collection of queries in a second language. For example, statistical machine translation techniques can be used to translate the queries. In some implementations, the queries are submitted to a translation system that returns the translated queries. In some other implementations, the system translates the queries. Additionally, the label terms in the annotations can also be translated from the first language to the second language.

Statistical machine translation translate a sequence of input words in a source language to a sequence of translated words in a target language. Statistical machine translation depends on statistical models that are based on prior probabilities and statistical correlations between the occurrences of words in training corpora. Conventional applications of statistical machine translation assume that both the source and target languages are distinct natural languages (e.g., French, English, German, or Arabic). For example, a collection of English language queries corresponding to a particular English language query pattern can be translated into a collection of Chinese language queries.

For the above English queries, the corresponding translated queries in Simplified Chinese are:
1) "时代广场附近 的纽约比萨"
2) "福布斯大街 附近的餐馆"

The system aligns 410 the translated collection of queries. In particular, the translated collection of queries are aligned with respect to the annotations, which have been retained for the translated queries. The most common term in the translated collection of queries is identified. The most common term is likely to be the pattern term (e.g., a trigger term that is common to queries of the patter, for example, the specific connecter term in a connector query pattern).

For example, for the connector pattern where the connector is "near" e.g., {what} near {where}, the most common term is likely the translation for "near" since it occurs in each query in the collection of queries. Based on the most common term, the relative positions of the annotations can be determined such as {where} and {what} based on a matching between the translated term on the translated labels. Thus, the corresponding translated text for portions of the query pattern can be identified, for example, what translated text corresponds to the "what" portion of the original English language query and what translated text corresponds to the "where" portion of the original English language query.

For example, for the above translated queries including positioned annotations provides:
1) 时代广场 {where} 附近的 {connector} 比萨 {what}
2) 福布斯大街 {where} 附近的 {connector} 餐馆 {what}
where 附近的 is the most common term corresponding to the translation of the connector "near" in Simplified Chinese. Additionally, the annotations for {what} and {where} (which may also be translated) are in different locations relative to the connector than in the original English pattern. Thus, applying the same pattern construction to the translation would have resulted in a misalignment of pattern annotations to the translated terms.

The system extracts 412 a translated query pattern from the aligned translated collection of queries. Based on the term alignment of each query, the system can determine the form that the majority of the queries agree on (e.g., some specified threshold amount of queries in the collection of translated queries). Continuing with the example, the majority of the translated queries can be found to match the common pattern of:

{where} 附近的 {what}

A threshold is used because there can be queries that match the query pattern but result in an erroneous aligned translation. However, these can be discounted or ignored as long as the threshold number of queries match the pattern.

For example, the annotated English query "day cares {what} near {connector} 111 riverroad, Houston, Tex.{where}" matches the query pattern. However, the Simplified Chinese translation of this query is 日托 {what} 近 {connector} 111 riverroad, 休斯敦, 得克萨斯州 {where}, which does not match the pattern form.

Additionally, the system can cross-validate the translated query pattern with a query log of the second language to ensure that queries matching the pattern occur with a threshold frequency. For example, the appearance of the pattern 附近的 where * is one or more terms, in the query logs can be checked to determine whether the pattern occurs with enough frequency to validate the pattern. The extracted pattern can be written in protobuffer form as:
    type: CONNECTOR
    language: "zh-CN"
    split_type: SPLIT_EXPLICIT
    connector: 附近的
    location_first: true The system uses 414 the translated query pattern to interpret received queries in the second language matching the translated query pattern. In particular, the system can use the translated query pattern in a similar manner as the query pattern in the first language. The matching query can be split into components according to the matching query pattern and used to search one or more indexes associated with the split components. The process can be repeated to generate a corresponding group of query patterns in the second language for use in interpreting a broad range of input queries in the second language.

Some additional example protobuffer format query patterns are provided below in several languages for the "near" connector. Each of these query patterns can be automatically generated given a base query pattern (e.g., given the English language query pattern, corresponding patterns can be identified for Spanish, French, and German, among other languages).

English:
   type: CONNECTOR
   language: "en"
   split_type: SPLIT_EXPLICIT
   connector: "near"
   location_first: false
Spanish
   type: CONNECTOR
   language: "es"
   split_type: SPLIT_EXPLICIT
   connector: "cerca de"
French
   type: CONNECTOR
   language: "fr"
   split_type: SPLIT_EXPLICIT
   connector: "prés de"
German
   type: CONNECTOR
   language: "de"
   split_type: SPLIT_EXPLICIT
   connector: "in der nähe von"

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage media for execution by, or to control the operation of, data processing apparatus. The computer storage medium can be, or be included in, a computer-readable storage device, a computer-readable storage substrate, a random or serial access memory array or device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed:

1. A method comprising:
   receiving a first query pattern, the query pattern identifying a particular rule to interpret a particular type of query, the query pattern being in a first language;
   identifying, with a system comprising one or more computing devices, a collection of queries in the first language matching the query pattern by determining which queries in a query log match the query pattern;
   segmenting a given query among the collection into one or more tokens in the first language, wherein each token includes one or more terms from the given query;
   annotating each query of the collection of queries with one or more labels identifying the parts of each query, wherein annotating each query of the collection of queries with one or more labels comprises:
      associating each of the one or more tokens with corresponding components of the first query pattern; and
      annotating the one or more tokens with labels for the corresponding components of the first query pattern;
   translating the collection of annotated queries in the first language into a translated collection of queries in a second language; and
   extracting a translated query pattern from the translated collection of queries, wherein for the given one of the plurality of queries, extracting a translated query pattern from the translated collection of queries comprises:
      determining, from an order in which the one or more tokens into which the given query was segmented in the first language are translated into the second language, an order in which labels for the components of the first query pattern correspond to translated terms of the given query; and
      extracting the translated query pattern from the order in which labels for the components of the first query pattern correspond to the translated terms of the given query pattern.

2. The method of claim 1, further comprising:
   using the translated query pattern to interpret received queries in the second language matching the translated query pattern.

3. The method of claim 2, where using the translated query pattern includes applying the translated query pattern to a received query in order to identify one or more query splits into query components and using the resulting query components to search a respective index for each query component.

4. The method of claim 1, further comprising:
   using the translated query pattern to search for results responsive to a received query in the second language and presenting search results.

5. The method of claim 1, where identifying a collection of queries includes identifying queries from a query log that match the first query pattern.

6. The method of claim 1, where annotating each query includes labeling portions of the query according to the first query pattern.

7. The method of claim 1, where extracting a translated query pattern further comprises cross-validating the translated query pattern with a query log with respect to a specified occurrence threshold.

8. A system comprising:
   one or more processors configured to interact with a computer-readable medium in order to perform operations comprising:
      receiving a first query pattern, the query pattern identifying a particular rule to interpret a particular type of query, the query pattern being in a first language;
      identifying a collection of queries in the first language matching the query pattern by determining which queries in a query log match the query pattern;
      segmenting a given query among the collection into one or more tokens in the first language, wherein each token includes one or more terms from the given query;
      annotating each query of the collection of queries with one or more labels identifying the parts of each query, wherein annotating each query of the collection of queries with one or more labels comprises:
         associating each of the one or more tokens with corresponding components of the first query pattern; and annotating the one or more tokens with labels for the corresponding components of the first query pattern;

translating the collection of annotated queries in the first language into a translated collection of queries in a second language; and extracting a translated query pattern from the translated collection of queries, wherein for the given one of the plurality of queries, extracting a translated query pattern from the translated collection of queries comprises:

determining, from an order in which the one or more tokens into which the given query was segmented in the first language are translated into the second language, an order in which labels for the components of the first query pattern correspond to translated terms of the given query; and extracting the translated query pattern from the order in which labels for the components of the first query pattern correspond to the translated terms of the given query pattern.

9. The system of claim 8, further configured to perform operations comprising:

using the translated query pattern to interpret received queries in the second language matching the translated query pattern.

10. The system of claim 9, where using the translated query pattern includes applying the translated query pattern to a received query in order to identify one or more query splits into query components and using the resulting query components to search a respective index for each query component.

11. The system of claim 8, further configured to perform operations comprising:

using the translated query pattern to search for results responsive to a received query in the second language and presenting search results.

12. The system of claim 8, where identifying a collection of queries includes identifying queries from a query log that match the first query pattern.

13. The system of claim 8, where annotating each query includes labeling portions of the query according to the first query pattern.

14. The system of claim 8, where extracting a translated query pattern further comprises cross-validating the translated query pattern with a query log with respect to a specified occurrence threshold.

15. A non-transitory computer storage medium encoded with a computer program, the program comprising instructions that when executed by data processing apparatus cause the data processing apparatus to perform operations comprising:

receiving a first query pattern, the query pattern identifying a particular rule to interpret a particular type of query, the query pattern being in a first language;

identifying a collection of queries in the first language matching the query pattern by determining which queries in a query log match the query pattern;

segmenting a given query among the collection into one or more tokens in the first language, wherein each token includes one or more terms from the given query;

annotating each query of the collection of queries with one or more labels identifying the parts of each query, wherein annotating each query of the collection of queries with one or more labels comprises:

associating each of the one or more tokens with corresponding components of the first query pattern; and annotating the one or more tokens with labels for the corresponding components of the first query pattern;

translating, with a system comprising one or more computing devices, the collection of annotated queries in the first language into a translated collection of queries in a second language; and extracting a translated query pattern from the translated collection of queries, wherein for the given one of the plurality of queries, extracting a translated query pattern from the translated collection of queries comprises:

determining, from an order in which the one or more tokens into which the given query was segmented in the first language are translated into the second language, an order in which labels for the components of the first query pattern correspond to translated terms of the given query; and extracting the translated query pattern from the order in which labels for the components of the first query pattern correspond to the translated terms of the given query pattern.

* * * * *